United States Patent
Stevens et al.

(10) Patent No.: US 10,343,558 B2
(45) Date of Patent: Jul. 9, 2019

(54) FIXED STRUCTURE SEAT

(71) Applicant: NIO USA, Inc., San Jose, CA (US)

(72) Inventors: Colin J. Stevens, San Jose, CA (US); Teh Feng Fang, San Jose, CA (US); Bruno M. Barthelemy, Los Gatos, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/788,375

(22) Filed: Oct. 19, 2017

(65) Prior Publication Data

US 2019/0118678 A1 Apr. 25, 2019

(51) Int. Cl.
*B60N 2/06* (2006.01)
*B60N 2/22* (2006.01)
*B60N 2/16* (2006.01)

(52) U.S. Cl.
CPC .............. *B60N 2/2209* (2013.01); *B60N 2/06* (2013.01); *B60N 2/1615* (2013.01)

(58) Field of Classification Search
CPC ....... B60N 2/2209; B60N 2/1615; B60N 2/06
USPC .............. 297/316, 317, 322, 340, 341, 342, 297/344.15, 344.16, 344.17
See application file for complete search history.

(56) References Cited

U.S. PATENT DOCUMENTS

| | | | | | |
|---|---|---|---|---|---|
| 4,362,336 A | * | 12/1982 | Zapf | ........................ | A47O 7/46 297/317 |
| 4,518,201 A | * | 5/1985 | Wahlmann | ........... | B60N 2/2209 297/316 |
| 5,244,252 A | * | 9/1993 | Serber | .................. | A47O 3/0255 297/325 X |
| 5,358,308 A | * | 10/1994 | Judic | ..................... | B60N 2/045 297/317 X |
| 6,641,214 B2 | * | 11/2003 | Veneruso | ............. | B60N 2/0232 297/317 |
| 6,688,691 B2 | * | 2/2004 | Marechal | ............. | A47O 1/0352 297/317 |
| 7,140,682 B2 | * | 11/2006 | Jaeger | .................. | B60N 2/0224 297/344.15 X |
| 7,229,118 B2 | * | 6/2007 | Saberan | ............... | B60N 2/0224 297/341 X |
| 7,270,371 B2 | * | 9/2007 | Adragna | ............. | B60N 2/2209 297/317 X |
| 7,431,398 B2 | * | 10/2008 | Kuebler | ............... | B60N 2/0232 297/342 |
| 7,472,957 B2 | * | 1/2009 | Ferry | ..................... | B60N 2/206 297/340 X |
| 7,568,764 B2 | | 8/2009 | Harper et al. | | |
| 7,631,939 B2 | * | 12/2009 | Wulf | .................... | B60N 2/0232 297/344.17 X |
| 7,703,851 B2 | * | 4/2010 | Nakaya | .................. | B60N 2/181 297/342 |
| 8,439,435 B2 | * | 5/2013 | Gaither | .................. | B60N 2/242 297/317 X |

(Continued)

*Primary Examiner* — Rodney B White
(74) *Attorney, Agent, or Firm* — Sheridan Ross P.C.

(57) ABSTRACT

A vehicle seat includes a moveable structure supported by a fixed frame. The moveable structure includes a bottom portion configured to slide forward and rearward relative to the fixed frame, a back portion connected to the bottom portion and configured to both pivot and slide relative to the fixed frame, and an upper portion that, in some embodiments, is configured to rotate relative to the back portion.

20 Claims, 9 Drawing Sheets

(56) References Cited

U.S. PATENT DOCUMENTS

| | | | | |
|---|---|---|---|---|
| 8,523,280 B2* | 9/2013 | Kuno | ................... | B60N 2/2209 |
| | | | | 297/322 |
| 8,733,840 B2* | 5/2014 | Westerink | ............ | B60N 2/1625 |
| | | | | 297/317 C |
| 8,827,365 B2* | 9/2014 | Gaither | .................. | B60N 2/242 |
| | | | | 297/342 |
| 9,187,012 B2* | 11/2015 | Sachs | ....................... | B60N 2/22 |
| 9,199,555 B2* | 12/2015 | Livesey | ................... | B60N 2/06 |
| 9,227,729 B2* | 1/2016 | Udriste | .................. | B64D 11/06 |
| 9,358,906 B2* | 6/2016 | Taylor | ................... | B60N 2/0232 |
| 9,381,830 B2 | 7/2016 | Jeong et al. | | |
| 9,511,684 B2 | 12/2016 | Hamabe et al. | | |
| 9,809,133 B2* | 11/2017 | Finck | ................... | B60N 2/2209 |
| 2005/0017488 A1 | 1/2005 | Breed et al. | | |
| 2005/0242634 A1* | 11/2005 | Serber | .................. | B60N 2/0745 |
| | | | | 297/216.1 |
| 2006/0055214 A1* | 3/2006 | Serber | .................. | B60N 2/0745 |
| | | | | 297/216.1 |
| 2015/0137571 A1* | 5/2015 | Koike | ................... | B60N 2/643 |
| | | | | 297/340 |
| 2016/0159252 A1* | 6/2016 | Jeong | .................. | B60N 2/2209 |
| | | | | 297/340 |
| 2016/0288671 A1 | 10/2016 | Zimmerman, II | | |

\* cited by examiner

FIXED STRUCTURE SEAT

FIELD

The present disclosure is generally directed to vehicle seats, and more particularly to a vehicle seat comprising a fixed structure.

BACKGROUND

Conventional first-row automotive seats (e.g., driver and front passenger seats) combine several adjustment mechanisms into the seat structure. For example, such seats may be adjustable relative to the vehicle itself in the forward and backward direction and in the up and down direction. The angle of recline of the backs of such seats may also be adjustable. These conventional seats are provided with only basic seat adjustment functionality, and have a limited adjustment range.

U.S. Pat. No. 9,511,684, entitled "Vehicle Seat Control Device and Vehicle Seat Device," describes a vehicle seat in which left and right sides of the seat are capable of moving relative to each other in the up-down direction. U.S. Pat. No. 9,381,830, entitled "Reclining Apparatus for Rear Seat in Car," describes a reclining apparatus for a rear seat in a car that enables a seat back to recline along with movement of the seat cushion. U.S. Patent Application Publication No. US2016/0288671, entitled "Sedan Slouch Seat," describes a seat assembly comprising a seat back pivotally coupled to a seat cushion, where the seat back is automatically pivoted rearwardly in response to forward sliding movement of the seat cushion. U.S. Pat. No. 7,568,764, entitled "Reclining Rear Seat for Vehicle Having Four-Bar Link," describes a reclining rear seat that utilizes a pivoting, four-bar link arrangement between the underside of the seat bottom and the vehicle floor, which permits the occupant to move the seat between a reclining position and a non-reclining position without compromising storage space between the front and rear seat. Each of these references is hereby incorporated by reference herein, in its entirety.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
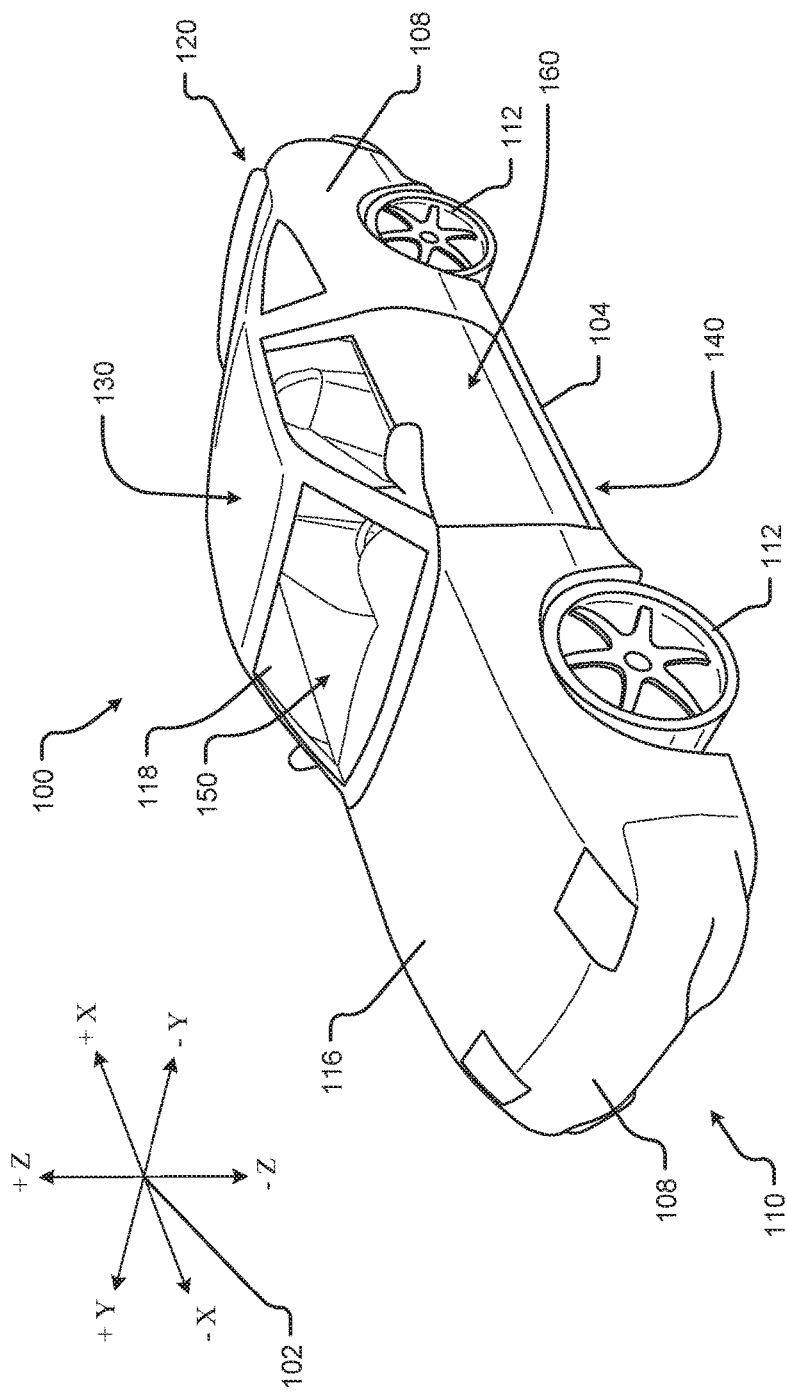
FIG. 1 shows a vehicle in which embodiments of the present disclosure may be installed.
Figure 2:
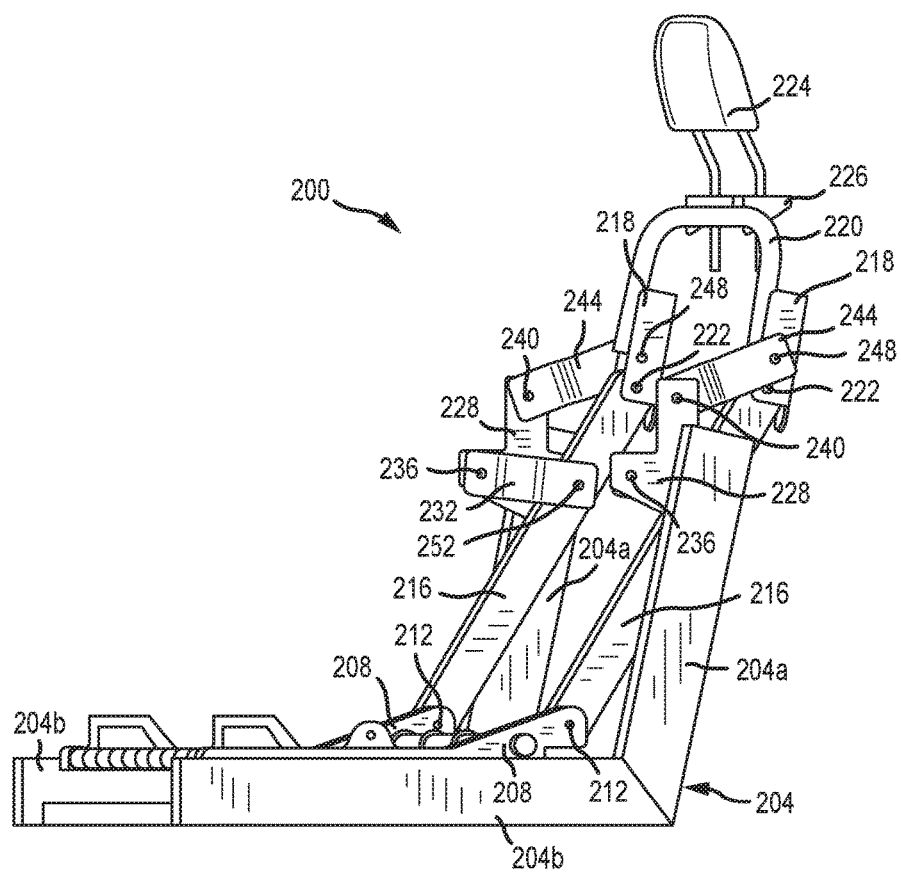
FIG. 2 shows a vehicle seat according to one embodiment of the present disclosure in an upright position.
Figure 3:
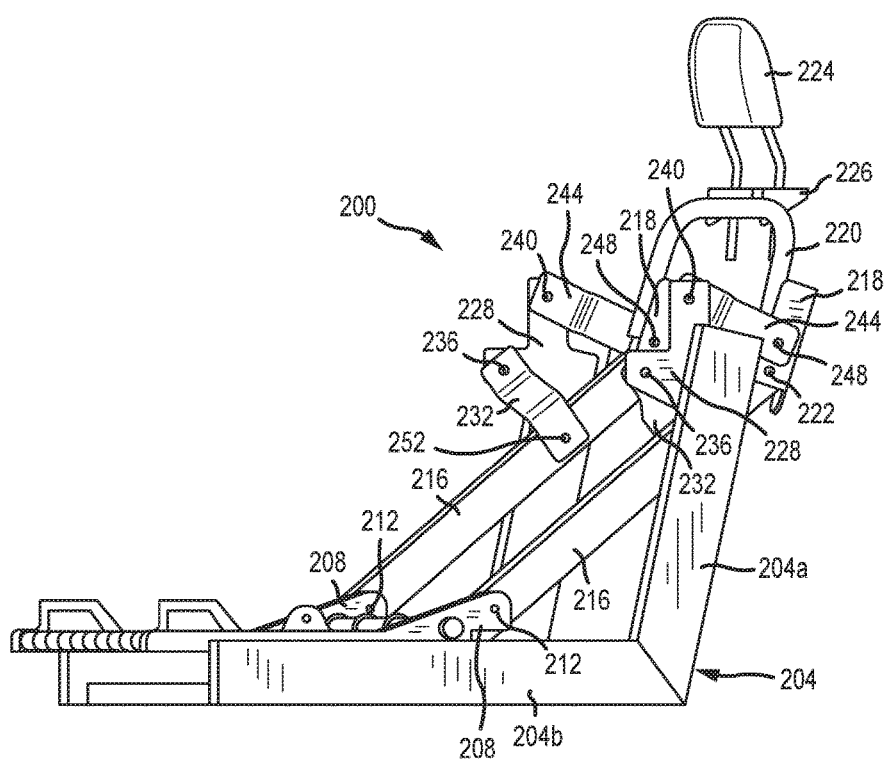
FIG. 3 shows the vehicle seat of the embodiment of FIG. 1 in a reclined position.

FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component. Similarly, references to forward movement throughout the present disclosure refer to movement in the −X direction, and references to rearward movement throughout the present disclosure refer to movement in the +X direction. References raising and lowering throughout the present disclosure refer to movement in the +Z and −Z directions, respectively.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front wheels 112 and the rear wheels 112. In some embodiments where the vehicle 100 is gas-powered, the gas-powered engine and associated components may be located in a rear compartment of the vehicle 100, leaving the front compartment available for storage or trunk space or for other uses. In some embodiments, the vehicle 100 may be, in addition to a battery-powered electric vehicle and a gas-powered vehicle, a hybrid electric vehicle, a diesel-powered vehicle, or a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Referring now to FIGS. 2-5, a fixed structure seat 200 comprises a fixed frame 204 having a back frame element 204a and a bottom frame element 204b, either or both of which may be fixedly attached to a vehicle such as the vehicle 100. For example, the bottom frame element 204b may be bolted, riveted, welded, or otherwise secured to the body structure of a vehicle 100 or to a riser of the vehicle 100 that is in turn secured to the body structure of the vehicle 100. The back frame element 204a may also be bolted, riveted, welded, or otherwise secured to the body structure of a vehicle 100, or to a structure or member that is otherwise connected or secured to the body structure of the vehicle 100. The fixed frame 204 is manufactured to be substantially rigid, which rigidity may result from the material from which the fixed frame 204 is manufactured, and/or from the design of the fixed frame 204. In some embodiments, the fixed frame 204 is made of steel, aluminum, or other metals. In other embodiments, the fixed frame 204 is manufactured from one or more composite materials, such as carbon fiber laminate. In still other embodiments, some or all of the fixed frame 204 may be manufactured from plastic.

In some embodiments, the fixed frame 204 may comprise solid structural elements, while in other embodiments the fixed frame 204 may comprise an outer sheath or shell surrounding a honeycomb material, one or more stiffening members (e.g., plates, baffles, rods), a solid or substantially solid filling, or a hollow interior. In some embodiments, the outer sheath or shell may be comprised of one material, while the structure surrounded by the outer sheath or shell may be comprised of a different material. Also, in some embodiments, regardless of whether the fixed frame 204 comprises an outer sheath or shell, the fixed frame 204 may be comprised of a plurality of materials. The back frame element 204a and the bottom frame element 204b of the fixed frame 204 are fixed in position relative to each other.

The fixed frame 204 supports a movable frame structure comprising a plurality of elements. In particular, sliding members 208 are slidably secured to the bottom frame element 204b. In some embodiments, wheels or balls rotatably attached to the sliding members 208 may be secured within a rail, step, or track that is formed on or within, or secured to, the bottom frame element 204b. In other embodiments, the sliding members 208 may comprise one or more slides formed of a material having a low coefficient of friction, which may run along a rail, step, or track formed on or within, or secured to, the bottom frame element 204b. In still other embodiments, one or more wheels, bearings, or other rotatable members may be rotatably affixed to the bottom frame element 204b, and the sliding members 208 may slide back and forth over such wheels, bearings, or other rotatable members. Other mechanisms known in the art may also be used to slidably secure the sliding members 208 to the bottom frame element 204b.

In some embodiments, a rear stop prevents the sliding members 208 from sliding beyond a certain point in the direction of the back element 204a, and/or a front stop prevents the sliding members 208 from sliding beyond a certain point in the opposite direction. Such stops may be affixed to the sliding members 208, the bottom frame elements 204b, or both. Such stops may comprise, for example, protrusions extending into the sliding path of the sliding members 208, and such protrusions may be integral with or attached to the fixed frame 204 and/or the sliding members 208. In embodiments using a rail, step, or track to facilitate the sliding of the sliding members 208, the rail, step, or track may have a fixed length, and the sliding members 208 may be attached to the rail, step, or track and/or to the fixed frame 204 in a manner that prevents the sliding members 208 from sliding beyond an end of the rail, step, or track. Other stops or stopping mechanisms known in the art may also be used in accordance with embodiments of the present disclosure.

The sliding members 208 are pivotably connected, at a pivot 212, to a lower end of the back members 216. In some embodiments, a lower end of each back member 216 may fit into a slot formed by a respective one of the sliding members 208, and a bolt, rod, bar, pin, or tube may be passed through one side of the sliding member 208, through the lower end of the back member 216 fitted within the slot of the sliding member 208, and through the other side of the sliding member 208 to pivotably secure the back member 216 to the sliding member 208. The bolt, rod, bar, pin, or tube may be fixedly secured to the sides of the sliding member 208 with one or more set screws or other fasteners or by welding, gluing, or other means known in the art. Alternatively, the bolt, rod, bar, pin, or tube may be secured in position (but allowed to rotate relative to one or both of the back member 216 and the sliding member 208) using cotter pins, or by locating fixed plates or other structural elements at each end of the bolt, rod, bar, pin, or tube so as to prevent the bolt, rod, bar, pin, or tube from moving out of position. In other embodiments, a hinge may be used to pivotably secure the back member 216 to the sliding member 208.

An upper end of each back member 216 is pivotably connected to a bracket 218 at a pivot 222. The pivotable connection between the upper end of the back member 216 and the bracket 218 may comprise any type of pivotable connection described above with respect to the pivotable connection between the back member 216 and the sliding member 208 at the pivot 212, or any other type of pivotable connection known in the art. Although the bracket 218 is shown as having two sidewalls forming a channel that receives the upper end of the back member 216 therein, in other embodiments the back member 216 may comprise a channel that receives a portion of the bracket 218, and in still other embodiments the bracket 218 and the upper end of the back member 216 may be pivotably connected in a side-by-side configuration.

The brackets 218 are fixedly secured to a top member 220, which supports a headrest 224 via a headrest mount 226. The height of the headrest 224 above the headrest mount 226 may be adjustable, as is known in the art, in order to accommodate individuals of varying sizes.

Relative motion of the back member 216 on the one hand and the brackets 218 (and thus the top member 220) on the other is controlled by a pair of closed chain linkages, each of which comprises a pivot plate 228, a lower arm 232, the back member 216, the bracket 218, and an upper arm 244. More particularly, the pivot plate 228 is fixedly secured to the back frame element 204a. The pivot plate 228 may be welded to the back frame element 204a, bolted to the back frame element 204a, or otherwise secured to the back frame element 204a in any manner known in the art. A first portion of the pivot plate 228 that extends away from the back frame element 204a is pivotably secured to one end of the lower arm 232 at a pivot 236, while an opposite end of the lower arm 232 is pivotably secured to the back member 216 at a pivot 252 positioned in between the pivots 212 and 222. The pivot point locations and member lengths of the closed chain linkages directly influences the slouch characteristics of the back member 216 and the brackets 218. For example, different slouching rates and slouching angles of the back member 216 and the brackets 218 can be achieved independently of each other by adjusting the relative pivot point positions and lengths of the lower arm 232 and the upper arm 244.

A second portion of the pivot plate 228 that also extends away from the back frame element 204a is pivotably secured to one end of the upper arm 244 at a pivot 240, while an opposite end of the upper arm 244 is pivotably secured to the bracket 218 at a pivot 248. As already explained above, the bracket 218 is pivotably connected to the back member 216 at the pivot 222.

Figure 4:
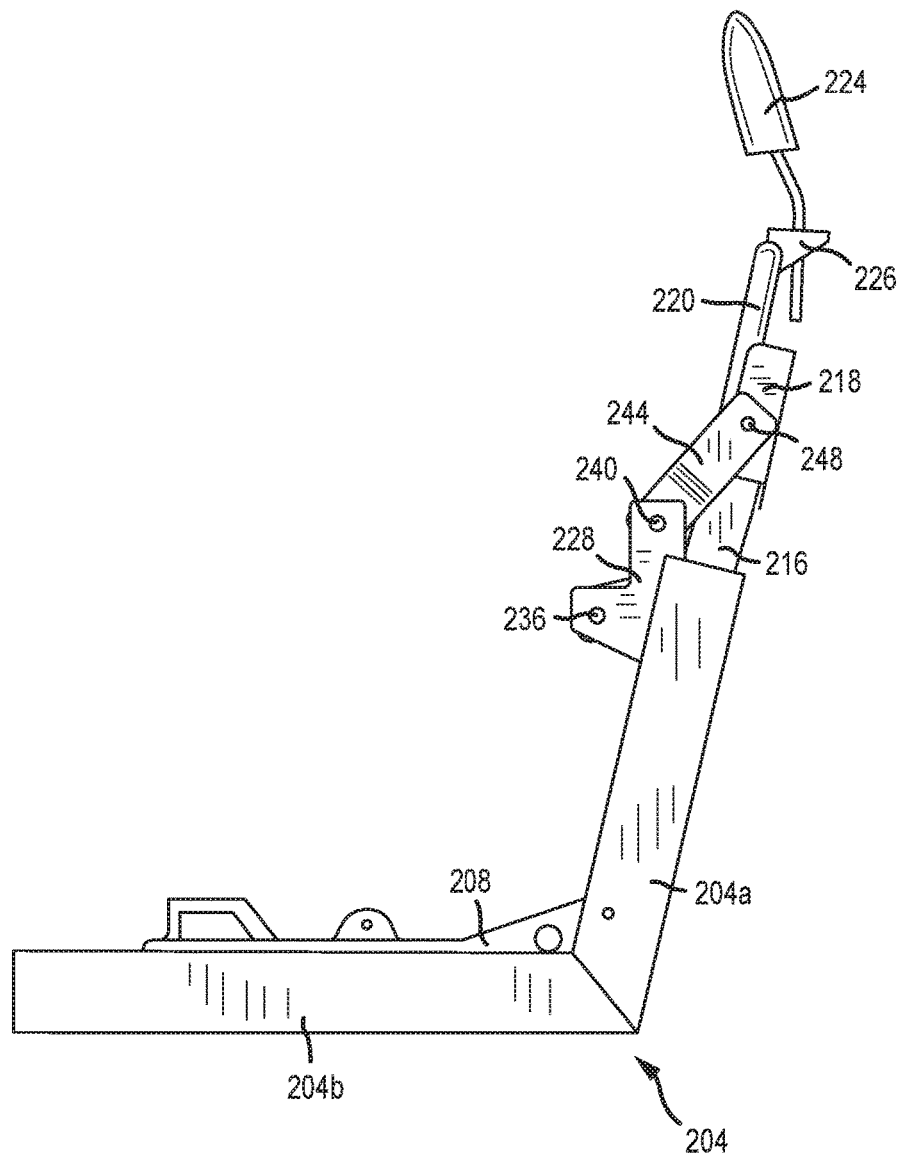
FIG. 4 shows a side view of the vehicle seat of the embodiment of FIG. 1 in an upright position.
Figure 5:
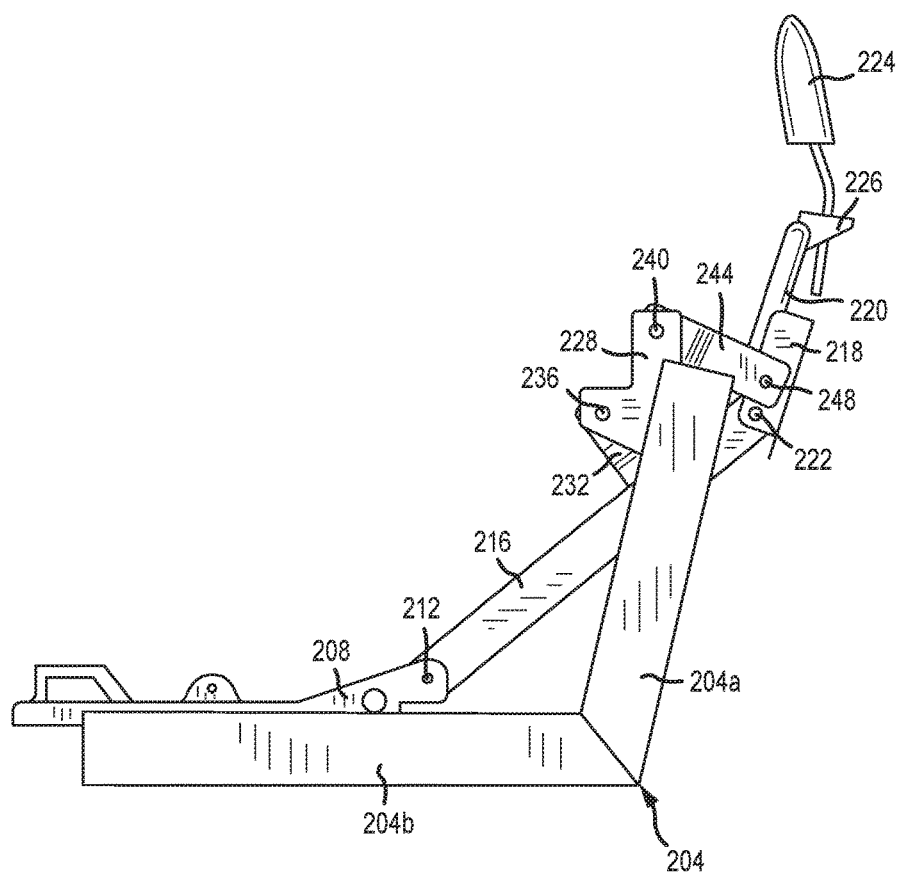
FIG. 5 shows a side view of the vehicle seat of the embodiment of FIG. 1 in a slouched position.

The closed chain linkages described above permit an unconventional "slouch" adjustment of the movable frame structure of the fixed structure seat 200 relative to the fixed frame 204, which is best understood with reference to FIGS. 4 and 5. Specifically, when the sliding members 208 are slid forward on the bottom frame element 204b (e.g., away from the back frame element 204a), the back member 216 rotates into a reclined position, while the top member 220 rotates relative to the back member 216 to stay at substantially the same angle relative to the fixed frame 204.

Likewise, when the sliding members 208 are slid backward on the bottom frame element 204b (e.g., toward the back frame element 204a), the back member 216 rotates into an upright position, while the top member 220 rotates relative to the back member 216 to again stay at substantially the same angle relative to the fixed frame 204.

As evident in FIG. 4, when the back member 216 is in the upright position, both the back member 216 and the top member 220 are substantially aligned with the back frame element 204a, with the top member 220 extending above the back frame element 204a. As shown in FIG. 5, when the back member 216 is in the reclined position, the back member 216 is rotated relative to the back frame element 204a, and the top member 220, while still aligned with the back frame element 204a, is offset relative to the back frame element 204a.

As persons of ordinary skill in the art will appreciate, the sliding members 208, the back members 216, and the top member 220 may each be configured to support seat cushioning, upholstery, and other conventional structure utilized to cover a seat frame, distribute the weight of a seat occupant to the seat frame, and provide a comfortable surface for supporting the occupant within the seat. Materials such as leather, fabric, rubber, plastic, and the like may be used alone or in combination to provide a seat covering that both conceals and protects the interior components of the fixed structure seat.

In addition to the unconventional "slouch" adjustment of the vehicle seat 200, other conventional adjustments may also be possible. For example, the vehicle seat 200 may comprise manual or automatic mechanisms for raising the sliding members 208 relative to the bottom frame elements 204b, and/or for moving the entire movable structure of the fixed structure seat forward or backward, without changing the angle of rotation of the back members 216 relative to the sliding member 208. These adjustments may be accomplished manually, or the vehicle seat may comprise appropriate motors and force transmission systems for accomplishing the adjustments automatically.

By way of example, in some embodiments of the present disclosure, adjustment of the movable structure within the fixed frame 204 may be accomplished manually. For example, a latch or other mechanism may hold the sliding members 208 of a vehicle seat 200 in a desired position, and a user may manually pull or push on a latch release lever that releases the latch or other mechanism. Once the latch or other mechanism is released, the user may slide the sliding members 208 forward or backward as desired, which in turn causes the back members 216 to rotate to the slouched or upright position, respectively. When the user releases the latch release lever, the latch or other mechanism may re-engage to hold the sliding members 208 in or near the position selected by the user. Additionally or alternatively, a gear and ratchet mechanism or other pumping mechanism may be used to raise and lower the movable portion of a vehicle seat 200 according to embodiments of the present disclosure.

In other embodiments of the present disclosure, one or more 12-volt motors may be configured to automatically move the sliding members 208 forward or backward, in accordance with a signal received from a user-operated switch. The one or more 12-volt motors may be in force communication with a gearbox or other set of gears that, in turn, is in force communication with the sliding members 208. The one or more 12-volt motors may be configured to receive electricity from a battery and/or alternator of the vehicle 100 or other vehicle in which the fixed structure seat is installed.

In some embodiments, the one or more 12-volt motors may be controlled by a microcontroller or other processor, which may be operatively connected to a computer-readable memory that stores information about one or more positions of the movable structure relative to the fixed frame 204. For example, the memory may store information about a position of the movable structure relative to the fixed frame 204 that facilitates entry into and exit from a vehicle, as well as instructions for execution by the microcontroller or other processor for operating the one or more 12-volt motors to move the movable structure into that position when the vehicle gearshift is moved to a "park," or when the vehicle is turned off, or in response to some other trigger. As another example, an operator of the vehicle may use one or more switches to operate the one or more 12-volt motors to move the movable structure into a preferred position within the fixed frame 204, and may then cause information about the preferred position to be stored in the computer-readable memory. Then, when the vehicle gearshift is moved to a "drive" configuration, when the vehicle is turned on, or in response to some other trigger, the microcontroller or other processor may cause (based on instructions stored in the computer-readable memory) the movable structure to move to the preferred position within the fixed frame 204. The present disclosure encompasses the storage, in a computer readable memory such as that described above, of data corresponding to one or both of factory preset positions of the movable structure within the fixed frame 204, and of user-defined positions of the movable structure within the fixed frame 204.

Figure 6:
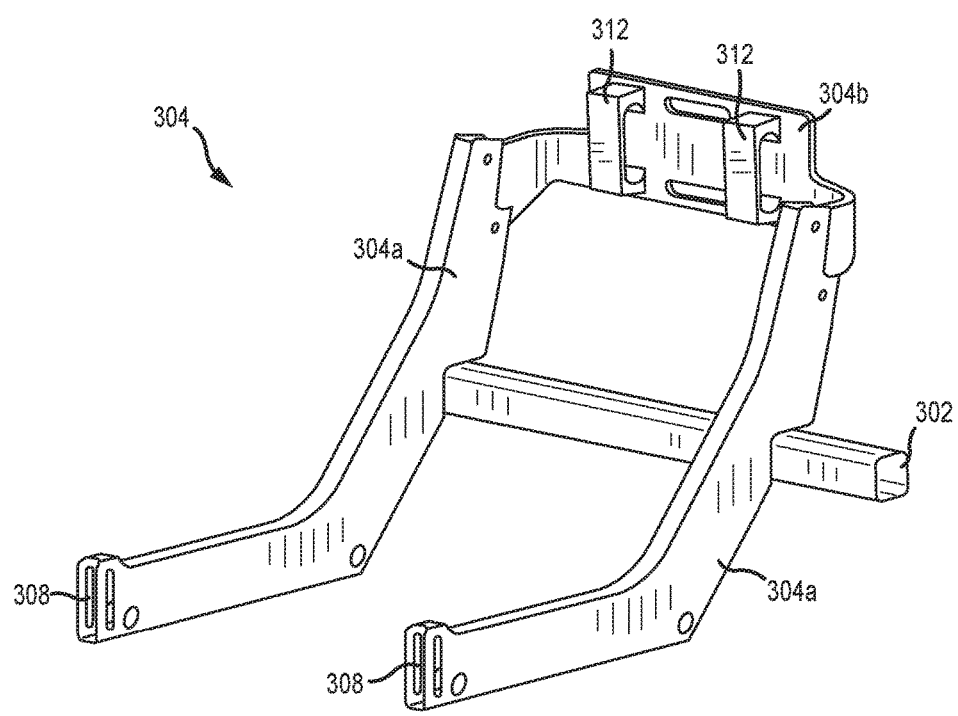
FIG. 6 shows a fixed frame for use with a vehicle seat according to another embodiment of the present disclosure.

Referring now to FIG. 6, vehicle seats according to some embodiments of the present disclosure comprise a fixed frame 304 comprising two parallel side frame members 304a connected by a back frame member 304b. The side frame members 304a and back frame member 304b, or portions thereof, may be manufactured, for example, using a stamping process and/or a casting process. In some embodiments, some or all of the fixed frame 304 may be made of steel, aluminum, or other metals. In other embodiments, some or all of the fixed frame 304 may be manufactured from one or more composite materials, such as carbon fiber laminate. In still other embodiments, some or all of the fixed frame 304 may be manufactured from plastic.

The fixed frame 304 may be mounted to a side impact cross tube 302 that is secured to the B-pillar (or other appropriate pillar, depending on the location of the seat in which the fixed frame 304 is used) of a vehicle 100. In some embodiments, a side impact cross tube 302 may run across the width of a vehicle, such as from one side of a B-pillar to the other side of the B-pillar. The side impact cross tube 302 may beneficially be positioned above the floor of the vehicle, so as to provide greater leg room to an occupant of the vehicle seated behind the fixed frame 304 and side impact cross tube 302.

The side frame members 304a comprise a vertical guide track 308, and the back frame member 304b comprises a pair of slots 312. The function of these vertical guide tracks 308 and slots 312 is discussed below.

Figure 7A:
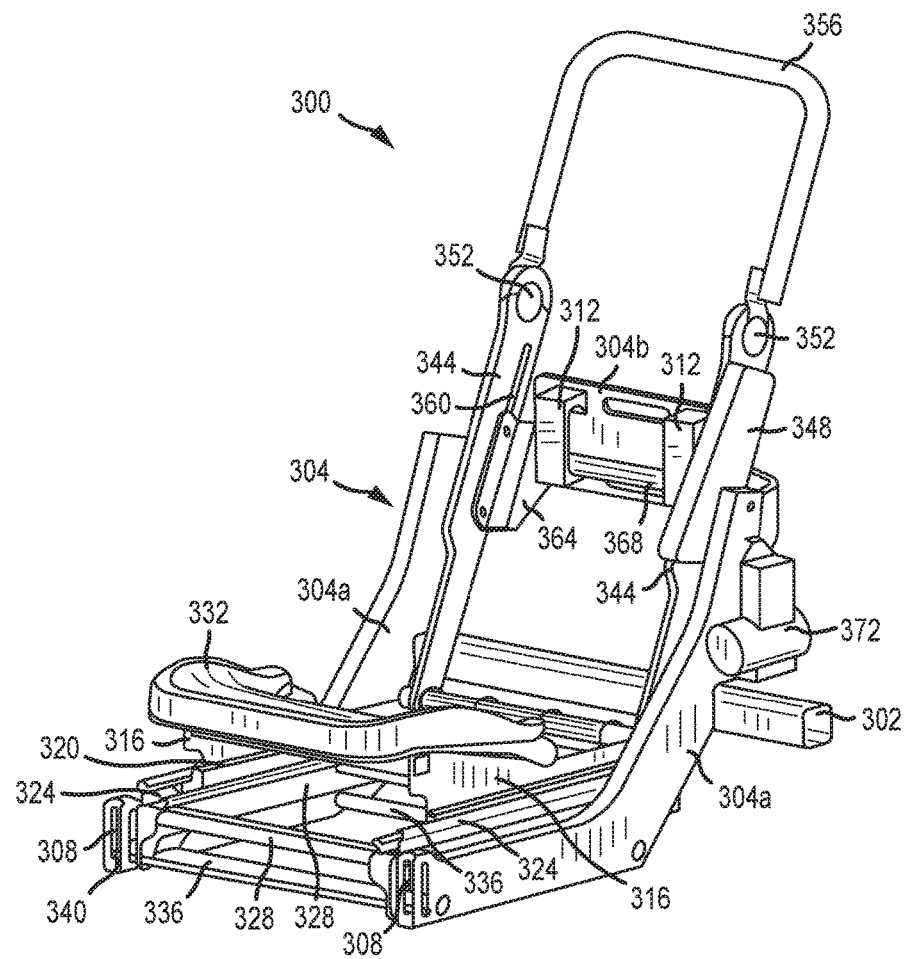
FIG. 7A shows a vehicle seat according to yet another embodiment of the present disclosure, in an upright, lowered position.
Figure 7B:
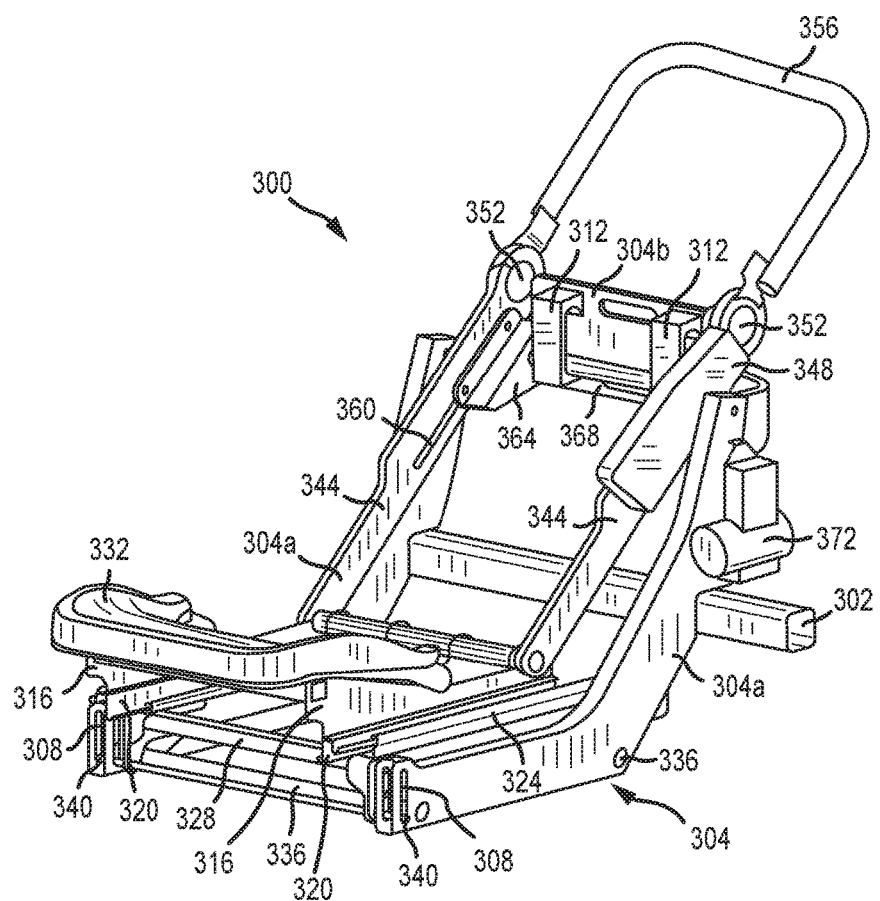
FIG. 7B shows a vehicle seat according to the embodiment of FIG. 7A in a slouched, lowered position.
Figure 7C:
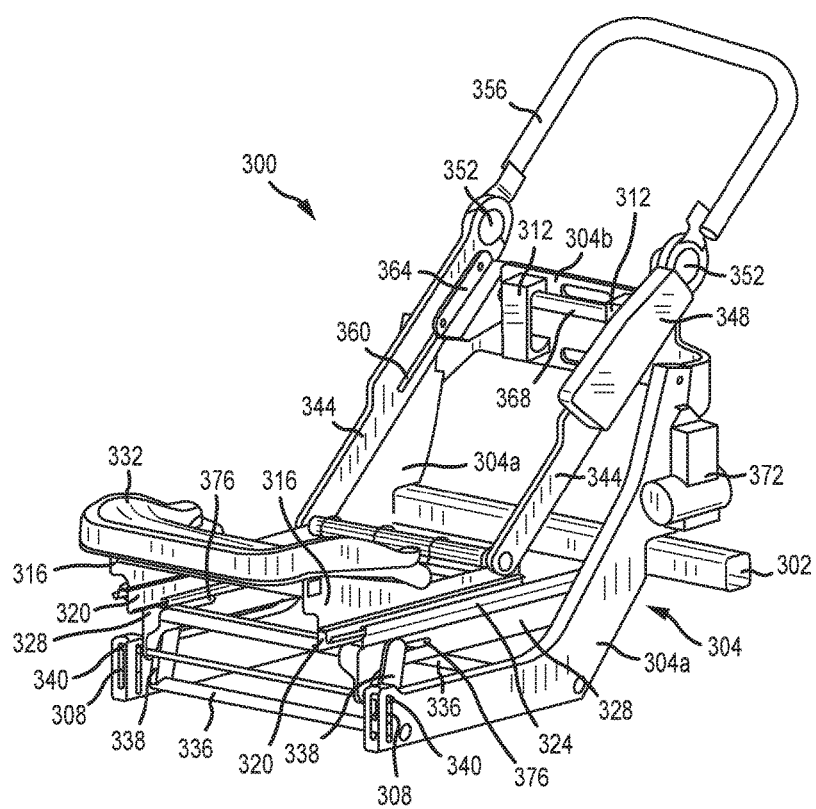
FIG. 7C shows a vehicle seat according to the embodiment of FIG. 7A in a slouched, raised position.

FIGS. 7A, 7B, and 7C depict a vehicle seat 300 comprising a fixed frame 304 supporting an adjustable seat structure. The adjustable seat structure includes an intermediate frame 328 that is supported by lift arms 338, which are slidably secured at one end to slots 376 in the intermediate frame 328, and are fixedly secured at another end to vertical lift bars 336. The vertical lift bars 336, in turn, are rotatably secured to the side frame members 304a of the fixed frame 304. The side frame members 304a, the lift arms 338, and the intermediate frame 328 form a 4-bar mechanism that is operable to raise and lower the intermediate frame 328 relative to the side frame members 304a. One or more linking members may link one or both of the lift arms 338, attached to the forward vertical lift bar 336, to one or both of the lift arms 338, attached to the rearward vertical lift bar 336, so as to ensure that each lift arm 338 (and each vertical lift bar 336) is in the same position, thus keeping the intermediate frame 328 level.

In some embodiments, a motor may be drivingly attached to one or both of the vertical lift bars 336 and configured to selectively (e.g., in response to user input) rotate the vertical lift bar(s) 336 counterclockwise and clockwise to raise and lower, respectively, the intermediate frame 328 relative to the side frame members 304a. In other embodiments, a lever or other mechanism may be fixedly attached to one or both of the vertical lift bars 336, so as to allow for manual raising and lowering of the intermediate frame 328. In such embodiments, one or more gears or other devices may be used to provide mechanical advantage in lifting the intermediate frame 328 (which may, for example, be supporting the weight of an occupant of the seat 300). Also, in some embodiments, a ratchet or other mechanism may be used to secure the intermediate frame 328 at a given height relative to the side frame members 304a.

The intermediate frame 328 may further be provided with a pair of guide pins 340, positioned to engage the vertical slots 308 of the fixed frame 304. The guide pins 340 beneficially ensure that the intermediate frame 328 travels in a straight-line vertical path as it is raised and lowered, rather than traveling in a parabolic path as a result of the four-bar mechanism used to raise and lower the intermediate frame 328.

Although the seat 300 is depicted as comprising a four-bar mechanism for raising and lowering the intermediate frame 328, in some embodiments other raising/lower mechanisms may be used. For example, in some embodiments, the lifting mechanism may be a hydraulic lift mechanism, a pneumatic lift mechanism, or a screw lift mechanism. Other lifting mechanisms may also be used within embodiments of the present disclosure.

The intermediate frame 328 supports a pair of outer rails 324. The outer rails 324 are aligned with the bottom portion of the side frame members 304a, and are configured to slidably engage with a pair of inner rails 320 fixedly secured to an upper seat frame 316. As a result, the upper seat frame 316 may slide forward and backward (e.g., along the X-axis of FIG. 1) relative to the side frame members 304a.

In some embodiments, the outer rails 324 and the inner rails 320 may comprise low-friction contact surfaces to facilitate the sliding of the inner rails 320 along the outer rails 324 and vice versa. In other embodiments, one or both of the inner rails 320 and the outer rails 324 may comprise wheels or bearings to facilitate the sliding of the inner rails 320 relative to the outer rails 324. Additionally, although the seat 300 comprises outer rails fixedly secured to the intermediate frame 328 and inner rails fixedly secured to the upper seat frame 316, in other embodiments the intermediate frame 328 may be fixedly secured to inner rails 320, and the upper seat frame 316 may be fixedly secured to outer rails 324. In still other embodiments, a sliding mechanism other than rails may be utilized to facilitate the sliding of the upper seat frame 316 relative to the intermediate frame 328. For example, the intermediate frame may comprise a pair of slots or tracks configured to receive wheels or bearings rotatably secured to the upper seat frame 316. Other sliding or translation mechanisms known in the art may also be used.

As with the vertical lift mechanism comprising the vertical lift bars 336, the lift arms 332, and the intermediate frame 328, the sliding or translating mechanism comprising the outer rails 324 and the inner rails 320 (or other sliding or translating mechanism known in the art) may be connected to a motor, which may be configured to automatically and selectively (e.g., in response to user input, or in response to the opening or closing of a vehicle door) cause the upper seat frame 316 to move forward or backward relative to the side frame members 304a. Alternatively, the sliding or translating mechanism may be provided with a manual release mechanism that allows a user to manually slide the upper seat frame 316 forward and backward relative to the side frame members 304a. The manual release mechanism may further be biased toward a locking position in which the upper seat frame 316 is secured in its forward/backward position relative to the side frame members 304a. In such embodiments, the user must move the manual release mechanism from its biased position in order to manually slide the upper seat frame 316 forward or backward relative to the side frame members 304a. When the user releases the manual release mechanism, it returns to the locking position and prevents further translational motion of the upper seat frame 316 relative to the side frame members 304a.

A cushion pan 332 is pivotably connected to the upper seat frame 316. The cushion pan 332 may be configured to automatically pivot (e.g., by a one degree, two degrees, three degrees, four degrees, five degrees, ten degrees, or fifteen degrees) relative to the upper seat frame 316 (e.g., so that the forward-most portion of the cushion pan 332 rises relative to the side frame members 304a) when the upper seat frame 316 slides forward along the outer rails 324. Such automatic pivoting may occur due to a mechanical linkage or interaction (e.g., a ramp or wedge may be positioned underneath the cushion pan 332 to push the cushion pan 332 upward as it moves forward), or may be accomplished using a motor configured to cause the cushion pan 332 to rotate relative to the upper seat frame 316. In other embodiments, the cushion pan 332 may be manually pivotable or rotatable. As with the vertical lift mechanism comprising the vertical lift bars 336, the lift arms 338, and the intermediate frame 328, the rotating or pivoting mechanism of the cushion pan 332 may comprise one or more mechanisms or devices to provide mechanical advantage in rotating or pivoting the cushion pan 332 (e.g., against the weight of an occupant of the seat 300).

The upper seat frame 316 is pivotably connected along a rear side thereof to a lower end of each of a pair of adjustable back members 344. The connection may be a direct connection between the adjustable back members 344 and the upper seat frame 316, as shown, or the connection may utilize one or more brackets or other intermediate members. An upper end of each of the pair of adjustable back members 344 is pivotably connected to an upper back member 356, so as to allow the upper back member 356 to rotate relative to the adjustable back members 344. A track 360 is provided along an inside portion of the length of the adjustable back members 344. The track 360 is configured to slidably receive a sliding link 364. A pivot bar 368 is fixedly secured at one end to the sliding link 364 that is slidably engaged with one of the pair of adjustable back members 344, and at the other end to the sliding link 364 that is slidably engaged with the other of the pair of adjustable back members 344. The pivot bar 368 is pivotably and slidably positioned within the slots 312 of the back member 304b.

In operation, the adjustable back members 344 are configured to pivot relative to the side frame members 304a (and around the axis of the pivot bar 368) as the upper seat frame 316 slides forward and backward along the outer rails 324. This results in a reclining motion of the adjustable back members 344 when the upper seat frame 316 slides forward, while rearward movement of the upper seat frame 316 causes the adjustable back members 344 to rotate toward an upright orientation. Additionally, as the upper seat frame 316 slides forward along the outer rails 324, the adjustable back members 344 slide relative to the sliding links 364. In FIG. 7A, for example, the adjustable back members 344 are in the upright position, and the sliding links 364 are positioned at the bottom-most end of the tracks 360. In FIG. 7B, the adjustable back members 344 are in the fully slouched position, and the sliding links 364 are positioned at the opposite end of the tracks 360. In contrast to conventional vehicle seats, in which the seatback pivots relative to the fixed seat bottom, the vehicle seat 300 enables a slouching movement, wherein the sliding movement of the seat bottom (e.g., of the upper seat frame 316) causes the seat back (e.g., the adjustable back members 344) to both pivot and slide between the upright and slouched positions.

FIG. 7C shows the seat 300 in the fully slouched position (e.g., with the upper seat frame 316 slid fully forward, the adjustable back members 344 reclined, and the sliding links 364 positioned at the upper-most end of the tracks 360) as well as in the fully lifted position. Thus, the vertical lift bars 336 are rotated so that the lift arms 338 extend nearly vertically, which has caused the intermediate frame 328 to rise vertically to a position almost entirely above the bottom portion of the side frame members 304a. The guide pins 340 are positioned at the upper end of the vertical guide tracks 308. Moreover, the rising of the intermediate frame 328 has likewise caused the lifting of the outer rails 324, the inner rails 320, the upper seat frame 316, and the cushion pan 332.

When the upper seat frame 316 is lifted by the action of the lift arms 338, the pivot bar 368 should also rise within the slots 312 so that the adjustable back members 344 do not slide relative to the sliding links 364 or rotate on the axis of the pivot bar 368 (or, in other words, so that the adjustable back members 344 maintain the same degree of slouch notwithstanding the lifting of the upper seat frame 316). In some embodiments, the vertical distance between a given point on the upper seat frame 316 and the pivot bar 368 remains the same as the lift arms 338 move the intermediate frame 328, and thus the upper seat frame 316, up and down. Various mechanisms may be used to ensure maintenance of the same vertical distance between the upper seat frame 316 and the pivot bar 368.

In some embodiments, one or more Bowden cables or other push/pull cables may be used to transmit a force from the upper seat frame 316 (or from the intermediate frame 328, or from one or more lift arms 338, or from one or more vertical lift bars 336) to the pivot bar 368. The force may be a pushing force when the lift arms 338 raise the intermediate frame 328, and a pulling force when the lift arms 338 lower the intermediate frame 328. In other embodiments, a rigid force-transmitting member may connect the intermediate frame 328 to the pivot bar 368, so that a lifting force applied by the arms 338 is transmitted to the pivot bar 368 through the intermediate frame 328. In still other embodiments, a pair of motors may be used—one to rotate the vertical lift bars 336 and thus the lift arms 338, and another to raise and lower the pivot bar 368 within the slots 312. In embodiments using motors, the motors may be selected and/or configured to ensure that the rate at which the motor drivingly connected to the vertical lift bars 336 causes the intermediate frame 328 to raise and lower is the same as the rate at which the motor drivingly connected to the pivot bar 368 causes the pivot bar 368 to raise and lower. Depending on the mechanism(s) used to transmit force from such motors to the vertical lift bars 336 and the pivot bar 368, achieving the same rate of vertical travel of the intermediate frame 328 and the pivot bar 368 may require that the motors operate at different rotational speeds. However, by maintaining the same rate of vertical travel (and by stopping and starting at the same time), the operation of the motors can be coordinated to ensure that raising or lowering the seat 300 does not result in a change to the slouch position of the seat 300.

As noted above, the upper back member 356 is pivotably mounted to the adjustable back members 344. This beneficially enables the upper back member 356 to pivot forward or backward relative to the adjustable back members 344. In some embodiments, the pivoting of the upper back member 356 may be controlled entirely by an occupant of the seat 300. The pivoting may occur manually. For example, an occupant may disengage a biased locking mechanism, rotate the upper back member 356 to a desired position, and release the biased locking mechanism to re-engage in a locked position. Alternatively, the pivoting may occur automatically. For example, an occupant may provide input through a button or switch that causes a motor in force transmitting communication with the upper back member 356 (and/or with one or both of the pivots 352) to operate, thus causing the upper back member to selectively rotate forward or backward around the pivots 352.

In still other embodiments, the rotational position of the upper back member 356 relative to the adjustable back members 344 may depend on the slouch position of the adjustable back members 356. In other words, as the adjustable back members 344 move from an upright position to a slouched position, the upper back member 356 may be configured to automatically rotate forward. This may beneficially ensure that an occupant of the seat can keep his or her head supported in an upright, forward-looking position, even while the occupant's torso is reclined. Additionally, where the seat 300 is positioned in front of a steering wheel, automatic forward rotation of the upper back member 356 as the seat 300 is moved into a slouched positioned may beneficially ensure that an occupant thereof may comfortably reach the steering wheel.

Although maintaining the upper back member 356 in an upright position may be beneficial while the seat 300 is partially slouched, such an upright position may not be desirable as the seat 300 approaches and reaches a fully slouched position. For example, if the fully slouched position is intended to facilitate resting or sleeping rather than driving, then an occupant of the seat 300 may prefer not to have his or her head supported in an upright position while the adjustable back members 344 are in the fully slouched position. In some embodiments, then, the upper back member 356 may be configured to rotate backward, toward or into alignment with the adjustable back members 344, as the adjustable back members approach and reach the fully slouched position.

Also shown in FIGS. 7A-7C, attached to one of the adjustable back members 344, is a side airbag module 348. By securing the side airbag module 348 to the adjustable back member 344, the side airbag module 348 is able to the maintain proper airbag coverage through the entire range of motion of the adjustable back member 344.

FIGS. 7A-7C also depict a seatbelt retractor module 372 positioned adjacent (on an outside side) to one of the side frame members 304a, and immediately above the side impact cross tube 302. Seatbelt retractor modules such as the seatbelt retractor module 372 are conventionally positioned in the vehicle B-pillar for front-row seats, or within the C- or D-pillar for second or third row seats. In convertibles or other vehicles without a pillar adjacent the seat, the seatbelt retractor module may be positioned inside the seat, which requires that the seat be strong enough to secure the occupant thereto in the event of a collision. Here, the use of the fixed frame 304, together with the positioning of the side impact cross tube 302, enables the seatbelt retractor module 372 to be secured to the outside of the seat 300, in a position between the side frame member 304a and any adjacent pillar (e.g., B-pillar, C-pillar, D-pillar), and above the side impact cross tube 302. The seatbelt retractor module 372 may therefore be secured to the side frame member 304a, to the side impact cross tube 302, and/or to an adjacent pillar. As a result, the movable portion of the seat 300 does not have to be strong enough to support the seatbelt retractor module 372 in the event of a collision, and the B-pillar (or other pillar) need not be large enough to contain the seatbelt retractor module 372 (thus allowing greater flexibility in overall design and shaping of the vehicle). Such an arrangement is not possible with conventional vehicle seats, because the position of the seatback relative to any fixed vehicle structure (e.g., a side impact cross tube, a vehicle pillar) changes as the seatback is reclined.

In some embodiments of the present disclosure, the lift arms 338 may be configured to adjust the height of the upper seat frame 316 by up to 50 mm, or up to 60 mm, or up to 70 mm. Also in some embodiments, the outer rails 324 and the inner rails 320 may be configured to allow the upper seat frame 316 to slide a total distance of between 100 and 200 mm, which total distance may be, for example, 150 mm or 160 mm or 170 mm. The cushion pan 332 may be configured to rotate upward by up to 10 degrees from horizontal, or up to 8 degrees from horizontal, or up 6 degrees from horizontal, or up to 4 degrees from horizontal. The adjustable back members 344 may be configured to recline to angles of up to 20 degrees from vertical, or 30 degrees from vertical, or 40 degrees from vertical, or 50 degrees from vertical. The upper back member 356 may be configured to rotate relative to the adjustable back members 344 across a range of up to 35 degrees, or up to 40 degrees, or up to 45 degrees, or up to 50 degrees.

As with the vehicle seat 200, the components of the vehicle seat 300 described herein may be configured to support and/or be covered with, for example, cushioning, upholstery, molding, or other components to provide a finished appearance as well as to provide a comfortable sitting experience for an occupant of the vehicle seat 300. Moreover, the vehicle seat 300 may be provided with an adjustable headrest (supported, for example, by the upper back member 356) and a lumbar support mechanism (which may be, for example, an air bladder that can be selectively inflated and deflated to accommodate the preferences of an occupant of the seat 300).

The fixed structure seats described herein may be used as front seats, middle seats, or rear seats of a vehicle.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation a fixed structure seat for installation in a vehicle. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a vehicle seat, comprising: a back frame member comprising a vertical slot; a pair of side frame elements fixedly secured to the back frame member; an intermediate frame supported by the pair of side frame elements; an upper seat frame slidably connected to the intermediate frame; a pair of sliding links fixedly secured to a pivot bar, the pivot bar slidably and pivotably contained within the vertical slot; a pair of adjustable back members pivotably connected to the upper seat frame, each of the pair of adjustable back members comprising a track that is slidably engaged with one of the pair of sliding links; and an upper back member pivotably connected to each of the pair of adjustable back members.

Aspects of the above vehicle seat include: wherein the intermediate seat frame is vertically adjustable relative to the pair of side frame elements; wherein each of the pair of side frame elements comprises a vertical guide track, and the intermediate frame comprises a pair of guide pins that slidably engage the vertical guide track; wherein the intermediate frame is supported by the pair of side frame elements via at least one vertical lift bar that is rotatably secured to the pair of side frame elements, the vertical lift bar comprising at least one lift arm that slidably engages a horizontal slot in the intermediate frame element; a connecting member extending between the intermediate frame and the pivot bar, the connecting member configured to maintain a predetermined vertical distance between the intermediate frame and the pivot bar as the intermediate frame is vertically adjusted; wherein the intermediate frame is fixedly secured to at least one first rail, the upper seat frame is fixedly secured to at least one second rail, and the at least one first rail slidably engages the at least one second rail; wherein one of the intermediate frame and the upper seat frame comprises a track, and another of the intermediate frame and the upper seat frame comprises at least one wheel or bearing that engages the track; wherein the adjustable back members are in an upright position when the upper seat frame is in a first position, and further wherein the adjustable back members are in a slouched position when the upper seat frame is in a second position forward of the first position; further comprising an airbag module secured to one of the pair of side frame elements; and wherein each of the pair of side frame elements is fixedly secured to a structural member of a vehicle.

Embodiments further include a slouching vehicle seat, comprising: a fixed frame, the fixed frame comprising two side frame members connected by a back cross member; a movable structure supported by the fixed frame, the movable structure comprising: a pair of adjustable back members slidably and pivotably connected to the back cross member, each of the pair of adjustable back members having a first end and a second end; an intermediate frame; a lifting mechanism secured to the fixed frame and configured to selectively raise and lower the intermediate frame; and an upper seat frame slidably connected to the intermediate frame, the upper seat frame pivotably connected to the first end of each of the pair of adjustable back members.

Aspects of the above slouching vehicle seat include: an upper back member pivotably connected to the second end of each of the adjustable back members; wherein the upper back member is configured to automatically rotate when the upper seat frame slides relative to the intermediate frame; wherein a connector is slidably attached to each of the pair of adjustable back members, the connector comprising two sliding links rotatably secured to a pivot bar; wherein the pivot bar is pivotably and slidably contained within a vertical slot in the back cross member; a motor configured to automatically and selectively slide the upper seat frame relative to the intermediate frame; a cushion pan rotatably secured to the upper seat frame.

Embodiments further include an adjustable seat comprising: an upper back member; a pair of adjustable back members, each of the pair of adjustable back members having an upper end and a lower end, the upper end connected to the upper back member; an upper seat frame pivotally connected to the lower end of each of the pair of adjustable back members; and a fixed frame, the fixed frame comprising two side frame members connected by a back frame member, wherein the upper seat frame is slidably connected to the side frame members and the pair of adjustable back members are slidably and pivotably connected to the back frame member.

Aspects of the above adjustable seat include: wherein the upper seat frame is slidably connected to the side frame members via an intermediate frame that is adjustably supported by the side frame members; wherein sliding movement of the upper seat frame in a first direction causes the pair of adjustable back members to move into an upright position, and sliding movement of the upper seat frame in a second direction opposite the first direction causes the pair of adjustable back members to move into a slouched position.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The terms "memory" and "computer-readable memory" are used interchangeably and, as used herein, refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARIVI926EJ-S™ processors. A processor as disclosed herein may perform computational functions using any known or future-developed standard, instruction set, libraries, and/or architecture.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A vehicle seat, comprising:
   a back frame member comprising a vertical slot;
   a pair of side frame elements fixedly secured to the back frame member;
   an intermediate frame supported by the pair of side frame elements;
   an upper seat frame slidably connected to the intermediate frame;
   a pair of sliding links fixedly secured to a pivot bar, the pivot bar slidably and pivotably contained within the vertical slot;
   a pair of adjustable back members pivotably connected to the upper seat frame, each of the pair of adjustable back members comprising a track that is slidably engaged with one of the pair of sliding links; and
   an upper back member pivotably connected to each of the pair of adjustable back members.

2. The vehicle seat of claim 1, wherein the intermediate seat frame is vertically adjustable relative to the pair of side frame elements.

3. The vehicle seat of claim 2, wherein each of the pair of side frame elements comprises a vertical guide track, and the intermediate frame comprises a pair of guide pins that slidably engage the vertical guide track.

4. The vehicle seat of claim 2, wherein the intermediate frame is supported by the pair of side frame elements via at least one vertical lift bar that is rotatably secured to the pair of side frame elements, the vertical lift bar comprising at least one lift arm that slidably engages a horizontal slot in the intermediate frame element.

5. The vehicle seat of claim 2, further comprising a connecting member extending between the intermediate frame and the pivot bar, the connecting member configured to maintain a predetermined vertical distance between the intermediate frame and the pivot bar as the intermediate frame is vertically adjusted.

6. The vehicle seat of claim 1, wherein the intermediate frame is fixedly secured to at least one first rail, the upper seat frame is fixedly secured to at least one second rail, and the at least one first rail slidably engages the at least one second rail.

7. The vehicle seat of claim 1, wherein one of the intermediate frame and the upper seat frame comprises a track, and another of the intermediate frame and the upper seat frame comprises at least one wheel or bearing that engages the track.

8. The vehicle seat of claim 1, wherein the adjustable back members are in an upright position when the upper seat frame is in a first position, and further wherein the adjustable back members are in a slouched position when the upper seat frame is in a second position forward of the first position.

9. The vehicle seat of claim 1, further comprising an airbag module secured to one of the pair of side frame elements.

10. The vehicle seat of claim 1, wherein each of the pair of side frame elements is fixedly secured to a structural member of a vehicle.

11. A slouching vehicle seat, comprising:
    a fixed frame, the fixed frame comprising two side frame members connected by a back cross member;
    a movable structure supported by the fixed frame, the movable structure comprising:
        a pair of adjustable back members slidably and pivotably connected to the back cross member, each of the pair of adjustable back members having a first end and a second end;
        an intermediate frame supported by the two side frame members;
        a lifting mechanism secured to the fixed frame and configured to selectively raise and lower the intermediate frame; and
        an upper seat frame slidably connected to the intermediate frame, the upper seat frame pivotably connected to the first end of each of the pair of adjustable back members.

12. The slouching vehicle seat of claim 11, further comprising an upper back member pivotably connected to the second end of each of the adjustable back members.

13. The slouching vehicle seat of claim 12, wherein the upper back member is configured to automatically rotate when the upper seat frame slides relative to the intermediate frame.

14. The slouching vehicle seat of claim 11, wherein a connector is slidably attached to each of the pair of adjustable back members, the connector comprising two sliding links rotatably secured to a pivot bar.

15. The slouching vehicle seat of claim 14, wherein the pivot bar is pivotably and slidably contained within a vertical slot in the back cross member.

16. The slouching vehicle seat of claim 11, further comprising a motor configured to automatically and selectively slide the upper seat frame relative to the intermediate frame.

17. The slouching vehicle seat of claim 11, further comprising a cushion pan rotatably secured to the upper seat frame.

18. An adjustable seat comprising:
an upper back member;
a pair of adjustable back members, each of the pair of adjustable back members having an upper end and a lower end, the upper end connected to the upper back member;
an upper seat frame pivotally connected to the lower end of each of the pair of adjustable back members; and
a fixed frame, the fixed frame comprising two side frame members connected by a back frame member,
wherein the upper seat frame is slidably connected to the side frame members via an intermediate frame and the pair of adjustable back members are slidably and pivotably connected to the back frame member.

19. The adjustable seat of claim 18, wherein the intermediate frame is adjustably supported by the side frame members.

20. The adjustable seat of claim 18, wherein sliding movement of the upper seat frame in a first direction causes the pair of adjustable back members to move into an upright position, and sliding movement of the upper seat frame in a second direction opposite the first direction causes the pair of adjustable back members to move into a slouched position.

* * * * *